(12) United States Patent
deFouw et al.

(10) Patent No.: US 6,474,109 B1
(45) Date of Patent: Nov. 5, 2002

(54) DEVICE AND METHOD FOR DRAWING OPTICAL FIBERS FROM A PREFORM

(75) Inventors: Marinus Jacob deFouw, Eindhoven; Antonius Henricus Elisabeth Breuls, Urmond, both of (NL)

(73) Assignee: Plasma Optical Fibre, B.V., Eindhoven (NL)

( * ) Notice: Subject to any disclaimer, the term of this patent is extended or adjusted under 35 U.S.C. 154(b) by 162 days.

(21) Appl. No.: 09/712,040

(22) Filed: Nov. 13, 2000

(30) Foreign Application Priority Data

Nov. 16, 1999 (NL) .............................................. 1013583

(51) Int. Cl.[7] .......................................... C03B 37/025
(52) U.S. Cl. ............................ 65/435; 65/510; 65/513; 65/533; 65/537; 65/538
(58) Field of Search .......................... 65/533, 537, 538, 65/510, 513, 435

(56) References Cited

U.S. PATENT DOCUMENTS

| 4,547,644 | A |   | 10/1985 | Bair et al. ............. 219/10.49 R |
| 4,578,098 | A |   | 3/1986  | Paek et al. ...................... 65/13 |
| 4,673,427 | A | * | 6/1987  | Van Der Giessen .......... 65/435 |
| 5,160,359 | A | * | 11/1992 | Strackenbrock .............. 65/435 |
| 5,637,130 | A | * | 6/1997  | Nagayama .................... 65/533 |
| 5,897,681 | A | * | 4/1999  | Lysson ......................... 65/510 |

FOREIGN PATENT DOCUMENTS

| EP | 0 321 182 | * | 6/1989 |
| EP | 0 329 898 | * | 8/1989 |
| EP | 0567961 A1 |   | 11/1993 |
| GB | 2212151 A |   | 7/1989 |
| JP | 58104032 |   | 6/1983 |
| JP | 62246837 |   | 10/1987 |
| JP | 03237037 |   | 10/1991 |
| JP | 08091862 |   | 4/1996 |
| WO | 9951534 |   | 10/1999 |

OTHER PUBLICATIONS

Machine Translation of JP 08091862, Apr. 1996.*

* cited by examiner

*Primary Examiner*—James Derrington
(74) *Attorney, Agent, or Firm*—SEED IP Law Group PLLC

(57) ABSTRACT

The invention relates to a device for drawing optical fibers from a preform, comprising:
  a furnace comprising a tube for heating one end of said preform to the drawing temperature thereof, which tube comprises:
    i) a central tube,
    ii) an upper extension tube connected to the lower part of said central tube so as to obtain a gas tight seal against an ambient atmosphere exterior said furnace, wherein the upper extension tube comprises an inlet for an inert gas in the top region of the upper extension tube, as a result of which the preform and the fiber to be drawn therefrom are surrounded by an inert gas,
    iii) a lower extension tube connected to said upper extension tube in such a manner that a gas tight seal against an ambient atmosphere exterior said furnace is obtained,
    iv) a tube outlet connected to said lower extension tube,
  means for drawing the fiber,
  means for supporting the preform in the furnace.

14 Claims, 2 Drawing Sheets

DEVICE AND METHOD FOR DRAWING OPTICAL FIBERS FROM A PREFORM

Figure 1:
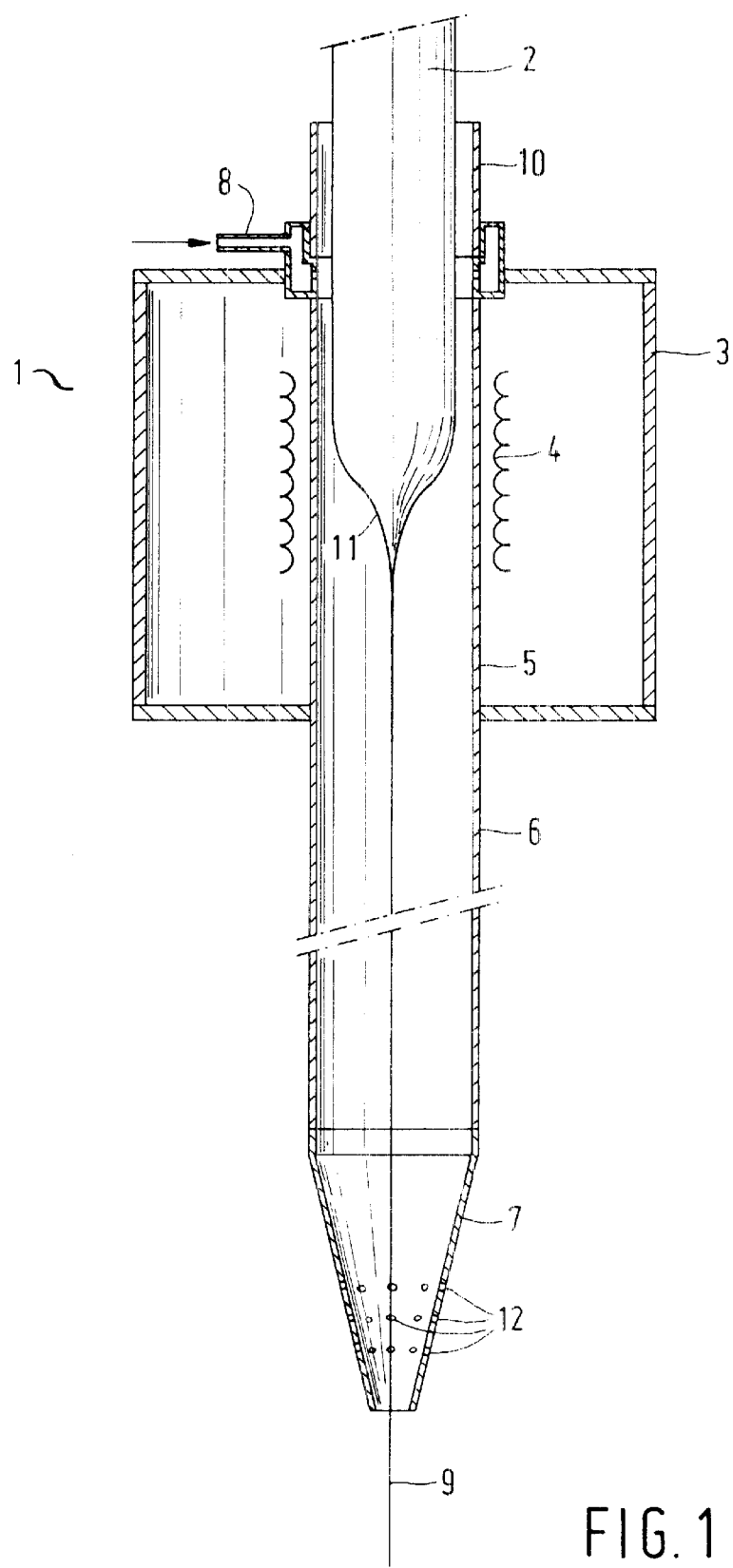

The present invention relates to a device for drawing optical fibres from a preform, comprising:
- a furnace comprising a tube for heating one end of said preform to the drawing temperature thereof, which tube comprises:
  - i) a central tube,
  - ii) an upper extension tube connected to the lower part of said central tube so as to obtain a gas tight seal against an ambient atmosphere exterior said furnace, wherein the upper extension tube comprises an inlet for an inert gas in the top region of the upper extension tube, as a result of which the preform and the fibre to be drawn therefrom are surrounded by an inert gas,
  - iii) a lower extension tube connected to said upper extension tube in such a manner that a gas tight seal against an ambient atmosphere exterior said furnace is obtained,
  - iv) a tube outlet connected to said lower extension tube,
- means for drawing the fibre,
- means for supporting the preform in the furnace.

The present invention furthermore relates to a method for drawing optical fibres from a preform.

Such a device is known per se from U.S. Pat. No. 4,673,427, which was granted to the present applicants in 1987 already. According to this US patent, an optical fibre is drawn from the heated end of the preform in a furnace, with a gas being carried along heating means in the furnace. The gas is essentially heated to the temperature of the fibre at the end of the preform, after which the hot gas flows along the fibre at essentially the same speed as the drawing speed of the fibre. Although the specification makes mention of the fact that the gas flow is a laminar gas flow, in order to ensure that the temperature gradient in the fibre will be lower at all times than the value at which stresses are set up in the fibre that will increase the optical attenuation, it has become apparent that minor turbulence is produced in the gas flow, which results in undesirable fluctuations in the diameter of the drawn fibre.

Such a device is also known from European patent application No. 0 321 182, in which device the furnace includes a recovery chamber at its bottom side for cooling the fibre in a uniform manner under conditioned circumstances. The connection between the furnace and the recovery chamber is provided with a seal to prevent the ingress of ambient air. While the fibre is being drawn from the preheated preform, an inert gas, such as nitrogen or helium, is supplied via two separate manifolds disposed adjacent to the upper side of the furnace, in order to ensure a symmetrical temperature distribution for cooling the fibre symmetrically. A construction of this kind leads to disturbances in the flow behaviour of the inert gas at the preform already, so that it is difficult to form a stable boundary layer around the fibre. Another drawback of such a device is the fact that, although the length of the recovery chamber depends on the height of the draw tower and the draw speed, wherein the length of the recovery chamber in question is about 45 cm at a line speed of 2 m/s, in practice there will be undesirable ingress of ambient air into the end of the recovery chamber. Such ingress of ambient air leads to diameter fluctuations. In addition, the relatively cold ambient air may set up stresses in the fibre, which is not sufficiently stabilized yet at that point, resulting in a diminished optical performance of the fibre thus obtained.

Such a device is also known from European patent application No. 0 329 898, wherein an inert gas is supplied to inlet openings located at the upper side of the furnace, after which said inert gas is caused to exit the heated furnace, using a shutter disposed at the bottom side of the furnace, perpendicularly to the direction of flow of the inert gas, which shutter includes a number of holes. The drawn fibre is discharged via the central opening of the shutter, whilst the inert gas is discharged via the other holes of the shutter. Although the ingress of ambient air is significantly reduced when such a construction is used, it has become apparent that the special construction of the shutter opening may cause undesirable turbulence of the inert gas that is present in the furnace, especially near the shutter, which will lead to undesirable diameter fluctuations.

Such a device is also known from European patent application No. 0 567 961, wherein a flow isolator is disposed at the bottom side of the furnace for symmetrically cooling the fibre drawn from the heated preform, which flow isolator includes a single outlet opening at its bottom opening. When using a construction of this kind, the same problems, in particular turbulence, will occur as described above with reference to European patent application no. 0 329 898.

Japanese unexamined patent application no. 6-115972 relates to a method for drawing optical fibres from a preform wherein the lower end of the furnace is in direct communication with the ambient atmosphere, so that also in this case there is an ingress of ambient air, which may lead to undesirable fluctuations in the fibre diameter.

The object of the present invention is to provide a method and a device for drawing optical fibres from a preform, wherein the aforesaid problems of the prior art do no occur.

Another object of the present invention is to provide a device and a method for drawing optical fibres from a preform wherein the extent to which particles adhere to the fibre is minimized, which particles mainly originate from the inner wall of the tube through which the fibre is passed, or they are formed as a result of the evaporation of quartz from the preform at the high drawing temperature.

Another object of the present invention is to provide a device and a method for drawing optical fibres from a preform, wherein the boundary layer of an inert gas that forms around the fibre provides symmetrically cooling of the fibre during the drawing process, wherein disturbance of the boundary layer must be minimized.

Another object of the present invention is to provide a device and a method for drawing optical fibres from a preform, wherein turbulence as well as swirling are prevented during the drawing process.

According to the present invention the device referred to in the introduction is characterized in that the tube outlet is conical in shape, wherein the internal diameter of the end of the tube outlet is smaller than the internal diameter of the upper extension tube so as to prevent the ingress of ambient atmosphere and turbulence and swirling within the tube outlet, which tube outlet includes a number of outlet openings for inert gas disposed on the circumference of said conical shape.

The use of outlet openings for inert gas disposed on the circumference of the conical shape of the tube outlet, preferably at the end thereof, ensures that the boundary layer of inert gas that surrounds the fibre will flow along with the fibre in a laminar flow in the drawing direction thereof, so that the occurrence of fibre twisting or of oscillations in the fibre diameter is reduced to a minimum. The conical shape is in particular desirable in order to eliminate pressure fluctuations, which occur in particular at the end of the tube outlet, where the fibre is discharged via the central opening of the tube outlet. As a result of the presence of the additional outlet openings for inert gas, part of the gas that surrounds the fibre is discharged, thus reducing the amount of turbulence caused by the narrowing of the outlet opening. Although it has been stated above that the outlet openings are disposed at the end of the tube outlet, said outlet openings may be positioned close to the transition from the lower extension tube to the tube outlet in certain embodiments.

Furthermore it is preferable that the internal diameter of the lower extension tube is substantially the same as the internal diameter of the upper extension tube.

By matching the diameter of the lower extension tube with that of the upper extension tube it is ensured that the inert gas flowing along with the drawn fibre in a boundary layer surrounding said fibre will not encounter any obstacles, so that the boundary layer will remain intact while the fibre is being moved and no stresses will be set up in the fibre.

In one special embodiment of the present invention it is preferable that the end of the tube outlet has an internal diameter of <30 mm, in particular <20 mm. Such a diameter is in particular desirable in order to prevent the ingress of ambient air. The ingress of ambient air may lead to combustion of the upper extension tube, with the resulting combustion products landing on the fibre to be drawn from the preform. Said combustion products may locally weaken the fibre that is eventually obtained, which may cause the fibre to break upon further processing. In addition, the ingress of ambient air has an adverse effect on the life of the materials used in the furnace.

When the fibre is being drawn from the preform it is very important that no particles adhere to the fibre circumference. Such contamination by particles from combustion products of materials used in the furnace leads to local weakening of the fibre, which is undesirable.

Consequent it is preferable for the upper extension tube to be made of a carbon selected from the group of high purity carbons having a low ash content, preferably of less than 200 ppm, and vitrified carbon. In addition to that it is preferable for the lower extension tube to be made of a material selected from the group of quartz glass and ceramic material, whereby it must furthermore be noted that the tube outlet is preferably made of a material selected from the group of metals and ceramic material. materials of this kind are not sensitive to the high temperatures that are used in drawing the optical fibre. In addition, the material used in the lower extension tube must be capable of withstanding the high temperatures that prevail in the interior thereof as well as the relatively cold ambient air on the outside thereof.

In a special embodiment of the present invention the inside of the tube outlet is provided with means that prevent particles hat have adhered to the internal surface of the lower and/or the upper extension tube and that may suddenly come off said surface from being carried towards the fibre and being deposited thereon due to the comical shape of the tube outlet. Such particles have an adverse effect on the quality of the drawn optical fibres. Such means may be one or more partitions, or baffles, or a rough scale-like structure that are suitably used on the inside of the tube outlet, with the dimensions and/or the positions thereof being selected to prevent the occurrence of harmful turbulence in the gas flow near the fibre. Partitions disposed on the inner circumference of the tube outlet, which are positioned to intercept particles that are carried along by the gas flow, have proved to be such suitable means.

The present invention furthermore relates to a method for drawing optical fibres from a preform, wherein the preform is heated in a furnace to the drawing temperature, after which the fibre is drawn from the heated end of the preform and subsequently discharged to the outside via, successively, an upper extension tube, a lower extension tube and the tube outlet, which method is characterized in that the tube inlet is conical in shape, wherein the internal diameter of the end of the tube outlet is smaller than the internal diameter of the upper extension tube so as to prevent the ingress of ambient atmosphere and the occurrence of turbulence and swirling inside the tube outlet, which tube outlet is provided with a number of outlet openings disposed on the circumference of its conical shape.

The present invention will be explained in more detail hereafter by means of a number of examples, wherein reference is made to the appended figures.

FIG. 1 schematically shows a device according to the present invention for drawing optical fibres from a preform.

Figure 2:
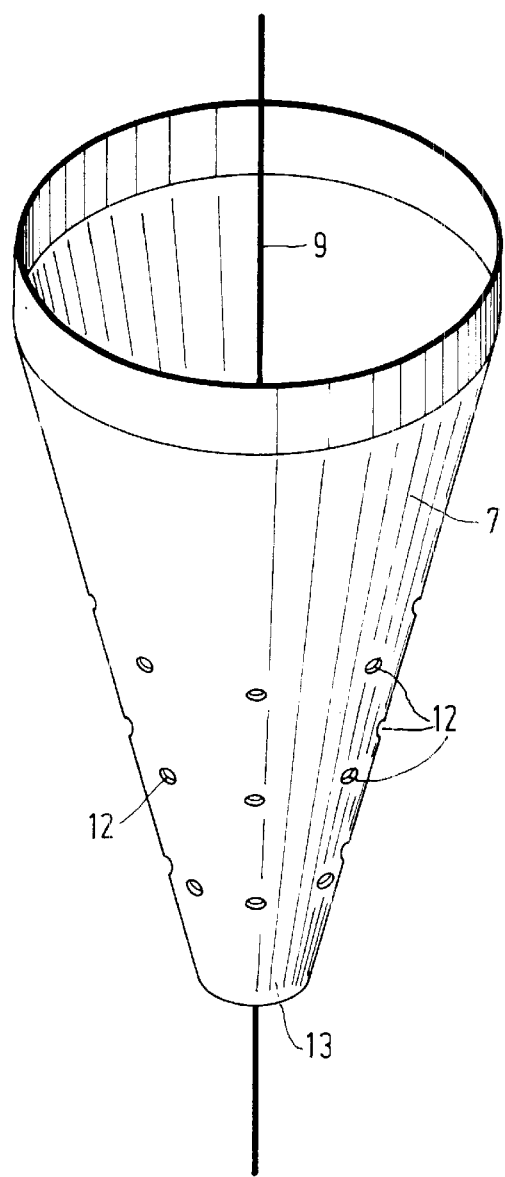

FIG. 2 schematically shows the tube outlet according the present invention.

Figure 3:
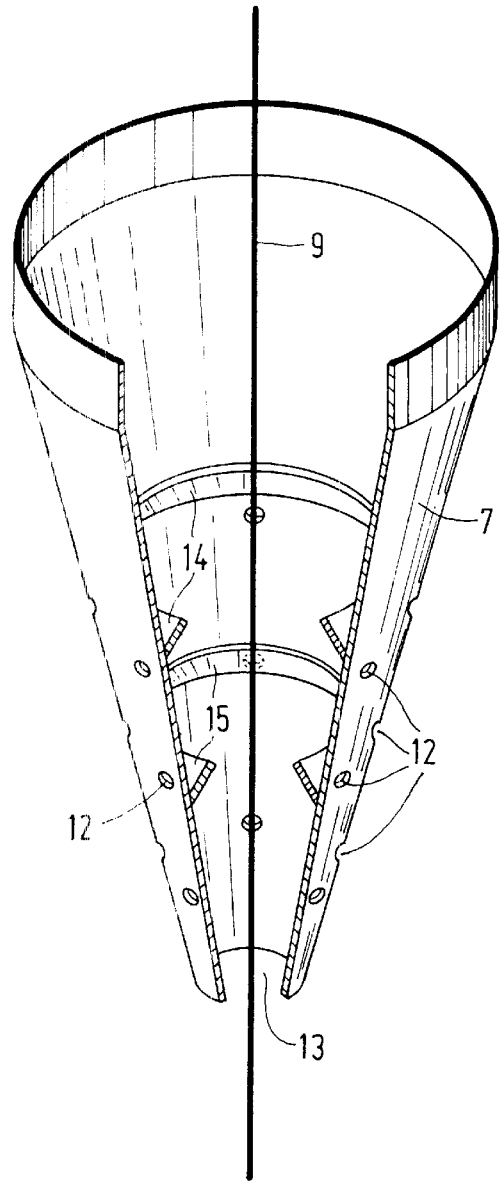

FIG. 3 schematically shows a special embodiment of he tube outlet according to the present invention.

In FIG. 1 the present device for drawing optical fibres from a preform is indicated at reference number 1. The present device 1 comprises a furnace 3, in which heating elements 4 are present, which heating elements 4 function to symmetrically heat the upper extension tube 5. The upper extension tube 5 is connected at its bottom side to a lower extension tube 6, which lower extension tube 6 is connected at its bottom side to tube outlet 7. The present device 1 also comprises a supply pipe 8 for an inert gas, through which said inert gas is carried into the upper extension tube 5, thus surrounding preform 2 and the fibre 9 to be drawn from said preform. Supply pipe 8 is in particular made from a material different from that of the upper extension tube 5, for example a metal. According to the present invention preform 2 is thus positioned within central tube 10, which central tube 10 is at its bottom side connected to furnace 3, in particular upper extension tube 5, in a gas tight manner. Heating elements 4 provide so high a temperature that preform 2 starts to melt, whereby an optical fibre 9 is drawn from cone 11. During the transport of optical fibre 9 in the direction of tube outlet 7 the conditions inside upper extension tube 5, lower extension tube 6 and tube outlet 7 are selected to cause fibre 9 to be subjected to symmetrically cooling. More in particular, tube outlet 7 is conical in shape, with the internal diameter of the end of tube outlet 7 being smaller than the internal diameter of the upper extension tube 5, which tube outlet 7 is provided, in particular at the end thereof, with a number of outlet openings 12 disposed on the circumference of the conical shape. Such outlet openings 12 in particular function to prevent internal pressure fluctuations at the end of tube outlet 7, which pressure fluctuations may lead to fibre twisting or to disturbances in the diameter of fibre 9.

FIG. 2 schematically illustrates the present tube outlet 7. The fibre 9 drawn from preform 2 (not shown) is discharged to the outside via central discharge opening 13 of tube outlet 7, whereby the inert gas is partially discharged via central discharge opening 13 and outlet openings 12. It should be noted that the outlet openings 12 on conical tube outlet 7 are only indicated schematically in FIG. 2, which means that the present invention is by no means limited to the special location of the outlet openings 12 that is shown in FIG. 2.

FIG. 3 schematically shows the present tube outlet 7 in cut-away view. Present inside tube outlet 7 are one or more partitions 14, 15, which function to intercept solid particles. Such particles are for example from the preform 2 or from the wall of the tube, in particular the upper and/or the lower extension tube 5, 6, through which fibre 9 is passed. Partitions 14, 15 preferably extend over the entire inner circumference of tube outlet 7. Although FIG. 3 is shown to have only two rows of partitions 14, 15, it should be understood that the number of rows is not limited to a specific number.

What is claimed is:

1. A device for drawing optical fibres from a preform, comprising:
    a furnace comprising a tube for heating one end of said preform to the drawing temperature thereof, which tube comprises:
        i) a central tube,
        ii) an upper extension tube connected to the lower part of said central tube so as to obtain a gas tight seal against an ambient atmosphere exterior said furnace, wherein the upper extension tube comprises an inlet for an inert gas in the top region of the upper extension tube, as a result of which the preform and the fibre to be drawn therefrom are surrounded by an inert gas,
        iii) a lower extension tube connected to said upper extension tube in such a manner that a gas tight seal against an ambient atmosphere exterior said furnace is obtained,
        iv) a tube outlet connected to said lower extension tube,
    means for drawing the fibre,
    means for supporting the preform in the furnace,
    wherein the tube outlet is conical in shape, wherein the internal diameter of the end of the tube outlet is smaller than the internal diameter of the upper extension tube so as to prevent the ingress of ambient atmosphere and turbulence and swirling within the tube outlet, which tube outlet includes a number of outlet openings for inert gas disposed on the circumference of said conical shape.

2. A device for drawing optical fibres from a preform according to claim 1, wherein the internal diameter of the lower extension tube is substantially the same as the internal diameter of the upper extension tube.

3. A device for drawing optical fibres from a preform according to claim 1, wherein the internal diameter of the end of the tube outlet is less than 30 mm.

4. A device for drawing optical fibres from a preform according to claim 3, wherein the internal diameter of the end of the tube outlet is less than 20 mm.

5. A device for drawing optical fibres from a preform according to claim 1, wherein the upper extension tube is made of a carbon selected from the group consisting of high purity carbons having an ash content of less than 200 ppm and vitrified carbon.

6. A device for drawing optical fibres from a preform according to claim 1, wherein the lower extension tube is made of a material selected from the group consisting of quartz glass and ceramic material.

7. A device for drawing optical fibres from a preform according to claim 1, wherein the tube outlet is made of a material selected from the group consisting of metals and ceramic material.

8. A device according to claim 1, wherein the tube outlet end has a number of outlet openings for inert gas disposed on the circumference of its conical shape.

9. A device according to claim 1, wherein the inside of the tube outlet is provided with means that prevent solid particles from the internal surface of the tube and/or from the material of the preform, which are carried along with the inert gas flow, from being led towards the drawn fibre.

10. A device according to claim 9, wherein the interior of the tube outlet is provided with one or more partitions that intercept the solid particles being carried along with the inert gas flow.

11. A method for drawing optical fibres from a preform, wherein the preform is heated in a furnace to its drawing temperature, after which the fibre is drawn from the heated end of the preform and subsequently discharged to the outside via, successively, an upper extension tube, a lower extension tube and a tube outlet, wherein the tube outlet is conical in shape, wherein the internal diameter of the end of the tube outlet is smaller than the internal diameter of the upper extension tube so as to prevent the ingress of ambient atmosphere and the occurrence of turbulence and swirling inside the tube outlet, which tube outlet is provided with a number of outlet openings for inert gas disposed on the circumference of its conical shape.

12. A method for drawing optical fibres from a preform according to claim 11, wherein a lower extension tube having an internal diameter that is substantially the same as the internal diameter of the upper extension tube is used.

13. A method for drawing optical fibres from a preform according to claim 11, wherein a tube outlet having an internal diameter of less than 30 mm at its end is used.

14. A method for drawing optical fibres from a preform according to claim 11, wherein a tube outlet having an internal diameter of less than 20 mm at its end is used.

* * * * *